United States Patent
Fan et al.

(10) Patent No.: US 6,781,698 B2
(45) Date of Patent: Aug. 24, 2004

(54) QUALITY REVIEW METHOD FOR OPTICAL COMPONENTS USING A FAST SYSTEM PERFORMANCE CHARACTERIZATION

(75) Inventors: Xudong Fan, Austin, TX (US); James F. Brennan, III, Austin, TX (US); Michael R. Matthews, Austin, TX (US); Pranay G. Sinha, Columbia, MD (US); Jerome C. Porque, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/237,325

(22) Filed: Sep. 9, 2002

(65) Prior Publication Data

US 2003/0063286 A1 Apr. 3, 2003

Related U.S. Application Data

(63) Continuation-in-part of application No. 10/185,979, filed on Jun. 28, 2002, now abandoned.
(60) Provisional application No. 60/301,737, filed on Jun. 28, 2001.

(51) Int. Cl.[7] .................................. G01B 9/02
(52) U.S. Cl. ........................................ 356/477
(58) Field of Search ........................ 356/401, 450, 356/477; 385/12

(56) References Cited

U.S. PATENT DOCUMENTS

| | | |
|---|---|---|
| 3,740,806 A | 6/1973 | Witzig et al. |
| 3,938,191 A | 2/1976 | Jarmy |
| 4,490,202 A | 12/1984 | Dumont |
| 4,914,797 A | 4/1990 | Tsuchida et al. |
| 4,932,989 A | 6/1990 | Presby |
| 5,400,674 A | 3/1995 | Arnone et al. |
| 5,585,982 A | 12/1996 | Yoshida et al. |
| 5,727,779 A | 3/1998 | Ramoski |
| 6,043,865 A | 3/2000 | Halup et al. |
| 6,093,927 A | 7/2000 | Wickham |

FOREIGN PATENT DOCUMENTS

WO    WO 01/20289 A1    3/2001

OTHER PUBLICATIONS

C. Scheerer, "Phase Distortions in Optical Transmission Systems", Frequenz, Schiele und Schon GmbH, Berlin, DE (Jan. 2000), vol. 54, No. ½, pp. 42–46.
L.G. Kazovsky, et al, "DBR Active Optical Filters: Transfer Function and Noise Characteristics", *Journal of Lightwave Technology*, IEEE, New York (Oct. 1, 1990), vol. 8 No. 10, pp. 1441–1451.
M. Zaacks, et al, "Measurement Technique of Phase Aberration Induced by Fiber Bragg Gratings", *Photonics Technology Letters*, IEEE, New York (Mar. 2002), vol. 14, No. 3, pp. 352–354.

*Primary Examiner*—Samuel A. Turner
*Assistant Examiner*—Michael A. Lyons
(74) *Attorney, Agent, or Firm*—Gregg H. Rosenblatt

(57) ABSTRACT

A method for screening the quality of an optical component including the step of simulating the performance of the optical component. The step of simulating includes the step of measuring the optical phase $\phi$ of the optical component, wherein the step of measuring comprises indirectly measuring the optical phase $\phi$ of the optical component using a scanning laser having a scanning step size $\Delta\omega$ and a modulation frequency $\omega_m$ such that $\Delta\omega/\omega_m \leq 2$. The light throughput R of the optical component is then measured. A transfer function H as a function of optical frequency $\omega$ is constructed where $H(\omega)=R(\omega)\exp[j\phi(\omega)]$, and the performance is simulated using the measured value of the optical phase and the light throughput into the transfer function.

12 Claims, 13 Drawing Sheets

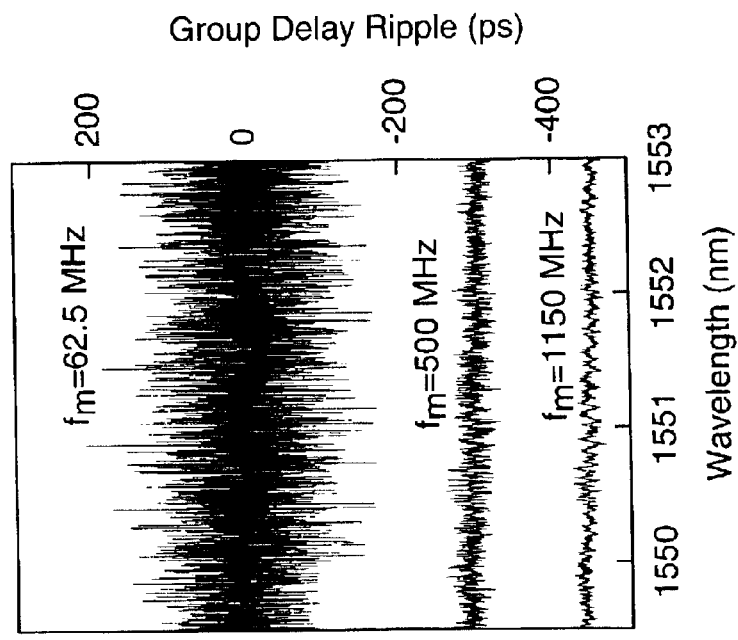
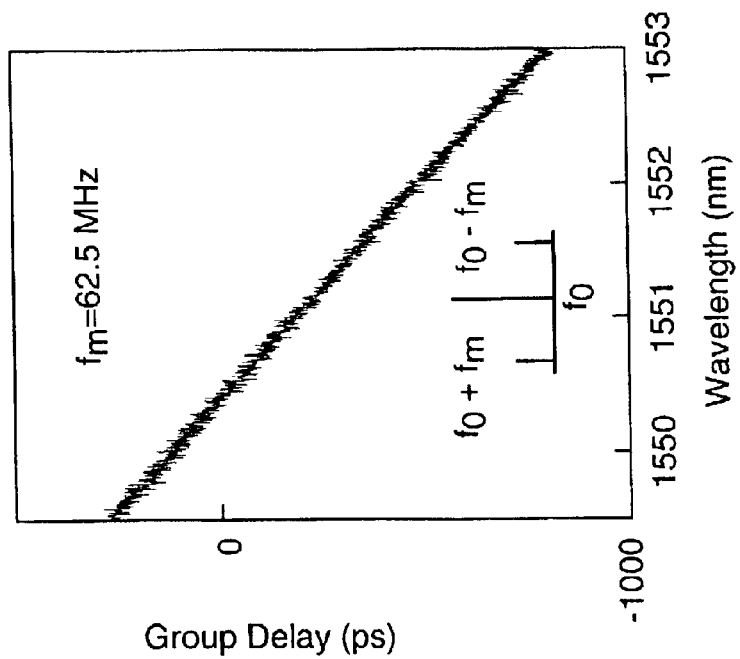
Fig. 2b
Fig. 2a

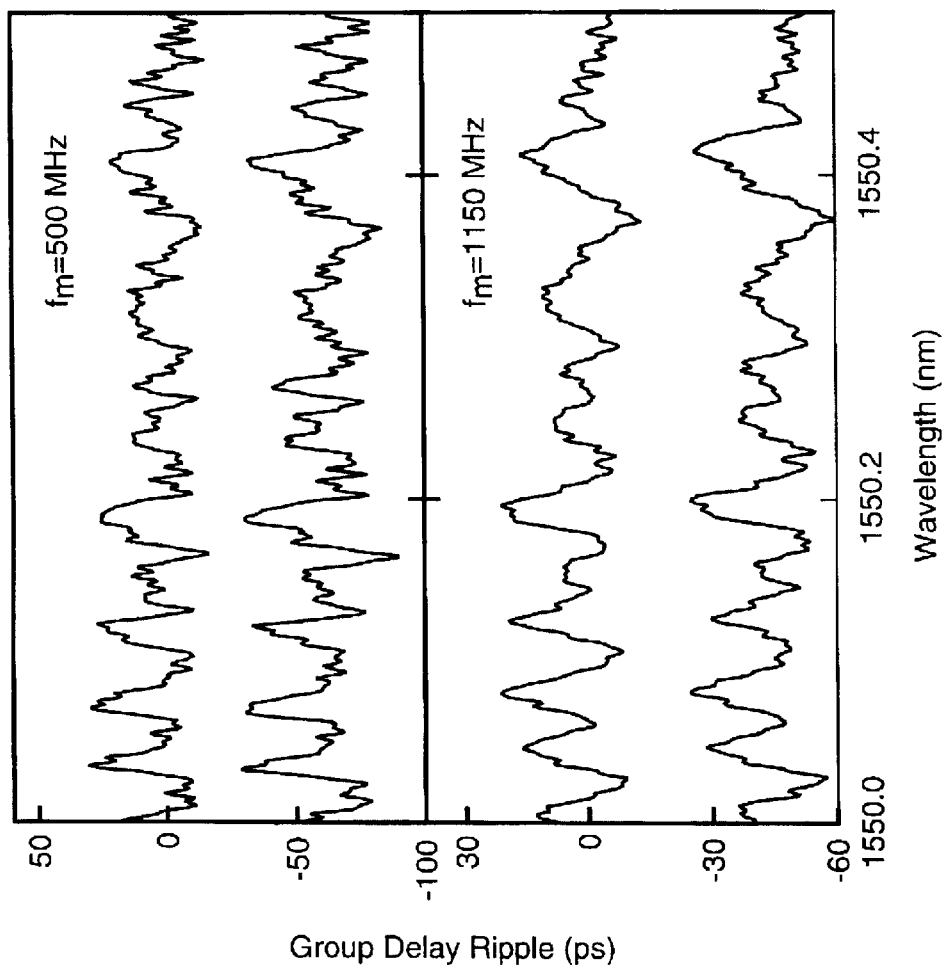

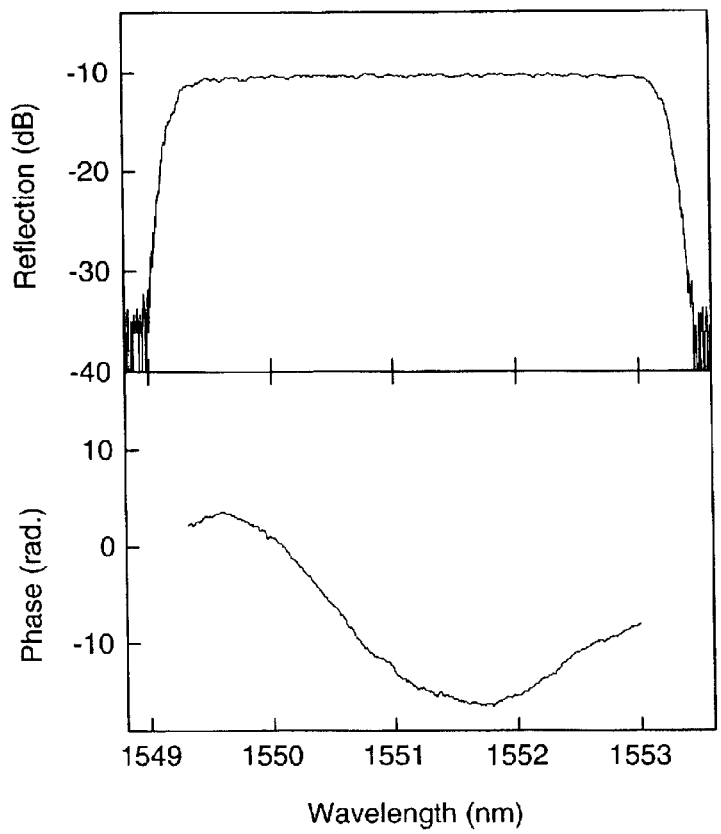
Fig. 5a
Fig. 5b
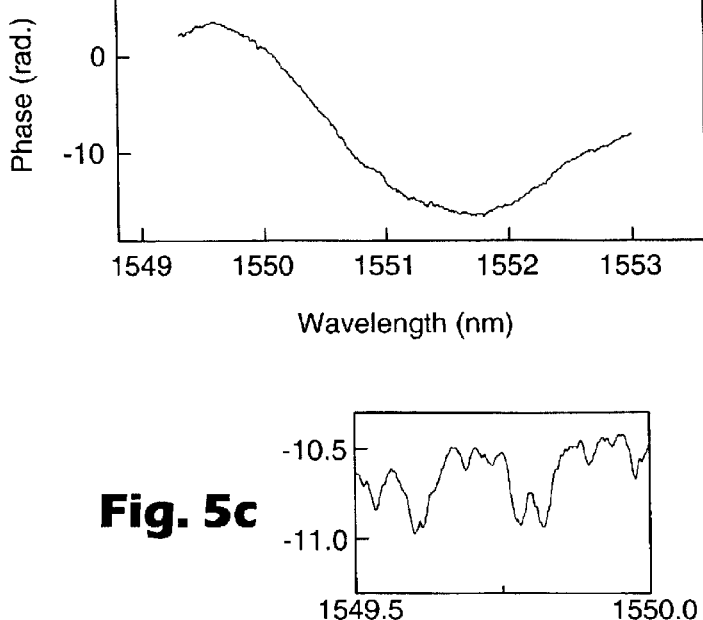
Fig. 5c
Fig. 5d

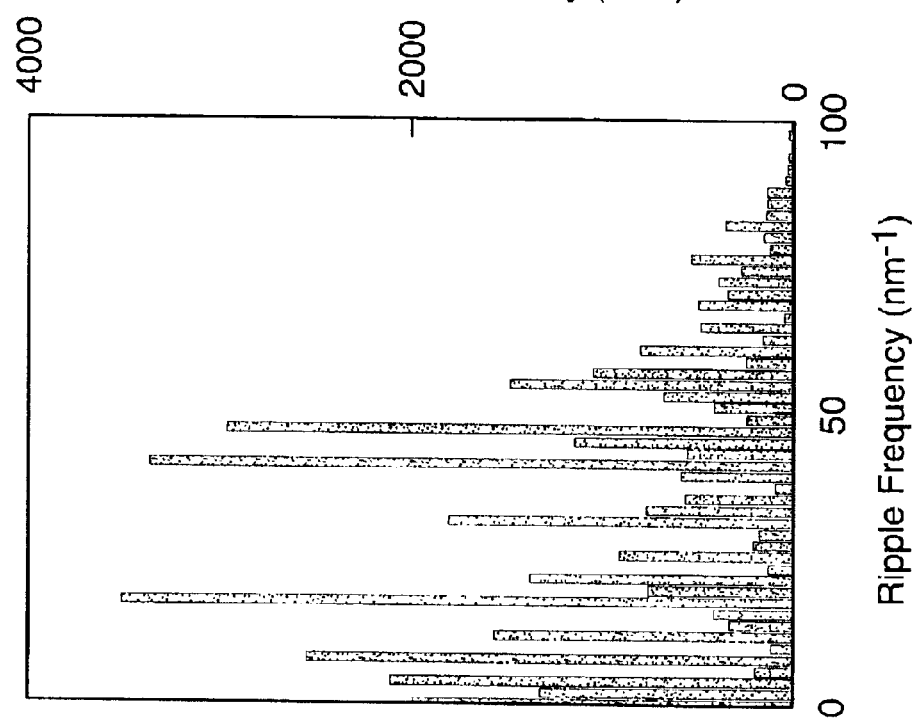
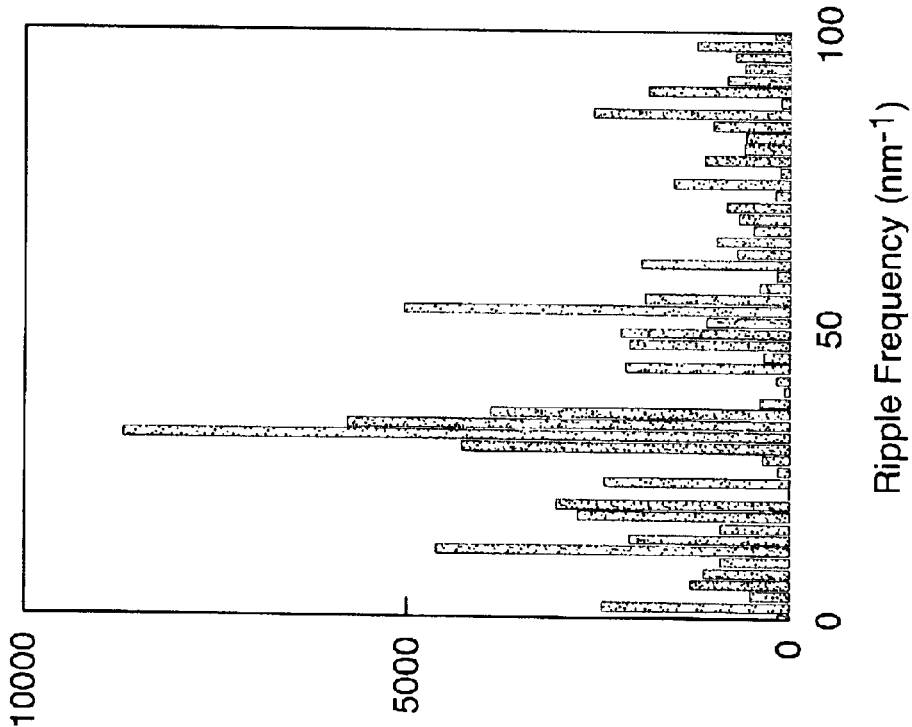
Fig. 8b
Fig. 8a

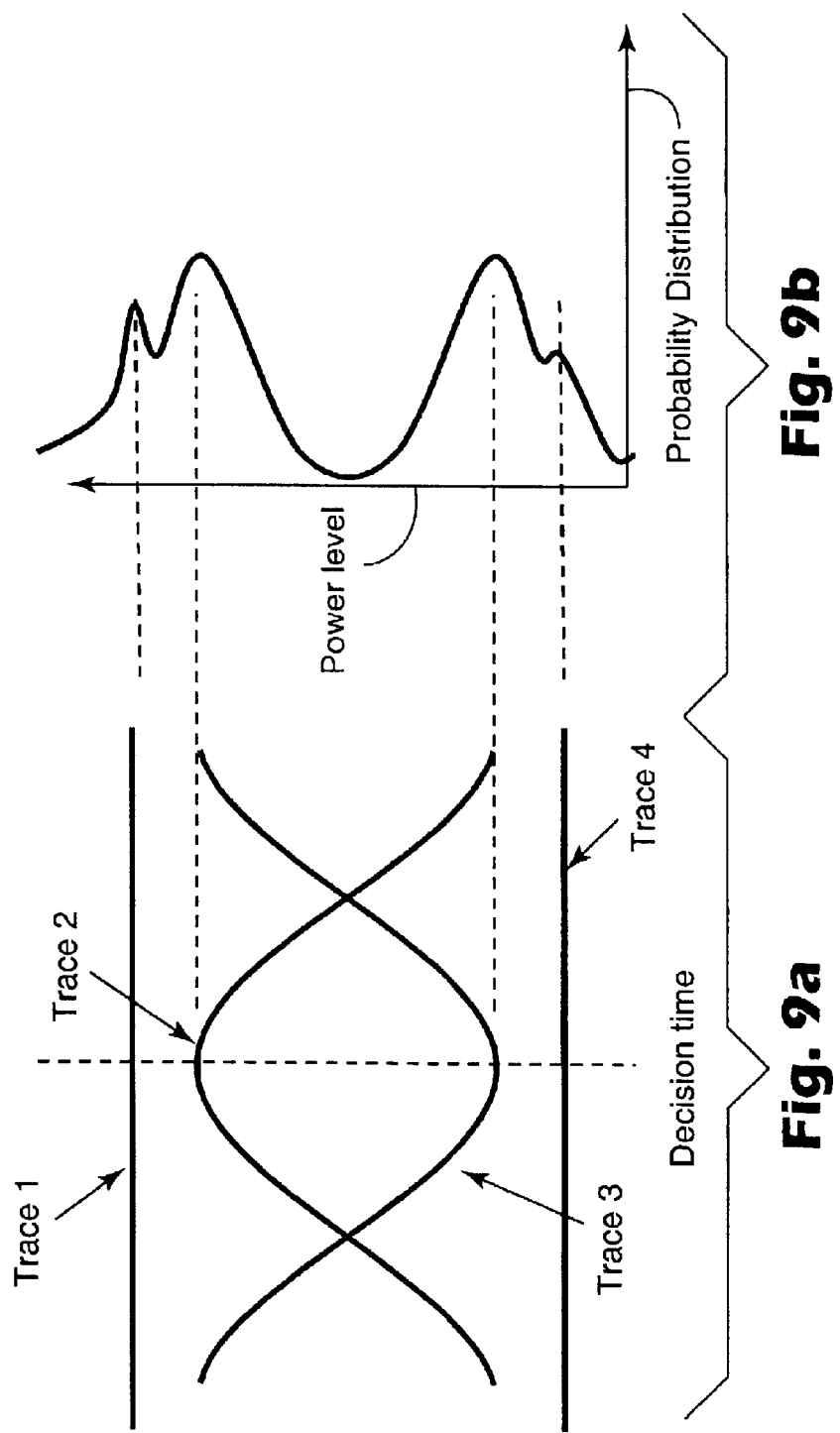

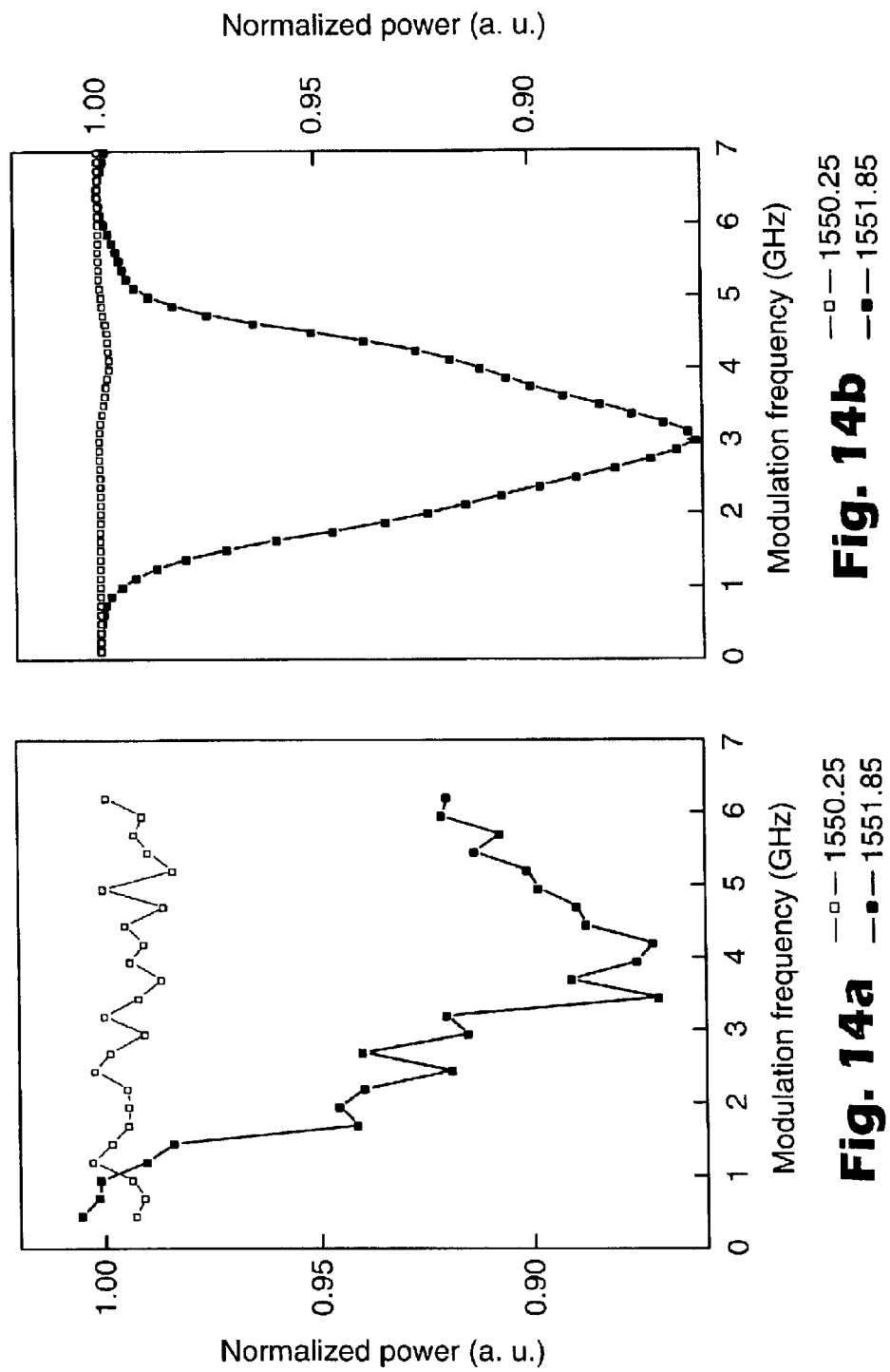

QUALITY REVIEW METHOD FOR OPTICAL COMPONENTS USING A FAST SYSTEM PERFORMANCE CHARACTERIZATION

RELATED APPLICATIONS

The present application is a continuation-in-part of U.S. application Ser. No. 10/185,979, filed on Jun. 28, 2002 abandoned, related to and claiming priority from U.S. Provisional Application No. 60/301,737, filed on Jun. 28, 2001, and entitled "A Fast System Performance Characterization Method Of Dispersion Compensating Fiber Bragg Gratings Based On Transfer Function And Modulation Transfer Function", which is hereby incorporated by reference.

FIELD OF THE INVENTION

The present invention relates to a method for rapidly evaluating the performance of optical components. In particular, the present method allows for a rapid characterization of the performance of optical components, such as Bragg gratings, which allows enhanced quality control and monitoring.

BACKGROUND

Optical components are devices that handle or process an optical signal. An important type of optical components are fiber Bragg gratings. Bragg gratings are patterns of refractive index perturbations. Long-length Bragg gratings, generally gratings longer than a quarter of a meter, are especially useful as dispersion compensation devices.

Dispersion compensation fiber Bragg gratings (DCFBGs) are becoming widely incorporated into optical telecommunication systems. Fabrication errors in chirped gratings may create unwanted variations in the optical group delay across the bandwidth of a fiber Bragg grating (FBG) dispersion compensation module and thus inaccuracies in its dispersion correction. These variations in the group delay are commonly referred to as delay ripple.

Relating the delay ripple characteristics of a DCFBG to its performance in a given optical system has been challenging, and most researchers will have confidence in a given DCFBG only after testing it fully in their systems. The performance of an optical component may be measured in several ways. Two important values for each optical component are generally the eye opening power penalty (EOPP) and bit error rate (BER). Eye opening power penalty is defined as the amount of the signal intensity increase to maintain the same BER. Bit error ratio (BER) is defined as the ratio between the number of errors detected by the receiver and the total number of bits transmitted.

Actual measurements of BER or EOPP are time-consuming. A typical actual measurement for a DCFBG entails conducting BER or EOPP measurements across the full bandwidth of the device with a spectral resolution of a few picometers. Fine-resolution BER tests across a chirped FBG with a bandwidth of a few nanometers can take tens of hours, and measurements across full-band devices (~30 nm) can require over 100 hours of evaluation time, making mass-production or testing of these devices impractical. A method is needed to identify quickly and accurately a defective DCFBG to increase manufacturing volumes and thus lower production costs. Such a method would be even more desirable if it also could be used to test the performance of discrete devices, such as equipment received from vendors, stored in inventory, or placed in the field.

SUMMARY

The present invention relates to a modulation phase shift (MPS) simulation method based on transfer function (TF) and modulation transfer function (MTF) of an optical component, such as a DCFBG, that allows one to quickly and accurately obtain the component's performance.

A method for screening the quality of an optical component in accordance with the present invention included the step of simulating the performance of the optical component. The step of simulating comprises the steps of measuring the optical phase $\phi$ of the optical component. The step of measuring comprises indirectly measuring the optical phase $\phi$ of the optical component using a scanning laser having a scanning step size $\Delta\omega$ and a modulation frequency $\omega_m$ such that $\Delta\omega/\omega_m \leq 2$.

The light throughput R of the optical component is measured. A transfer function H as a function of optical frequency $\omega$ is constructed where $H(\omega)=R(\omega)\exp[j\phi(\omega)]$. The performance is then simulated using the measured value of the optical phase and the light throughput into the transfer function.

The optical component may be an optical Bragg grating or a dispersion compensation optical grating. In a particular embodiment, the grating has a bandwidth greater than 1 nanometer. In a particular embodiment, $\Delta\omega/\omega_m=2$.

The step of measuring may comprises using an interferometer.

A method to simulate the performance (power penalty and bit error ratio) of an optical component, comprising the steps of:

measuring the phase $\phi$ of the optical component;

measuring the light throughput (reflectivity R or transmissivity) of the optical component;

constructing a transfer function H as a function of frequency or wavelength where $$H(\omega)=R(\omega)\exp[j\phi(\omega)]$$

simulating the performance using the transfer function.

Both TF and MTF may be constructed with the method of the present invention. For a 30-nm band DCFBG, the simulation takes a few minutes, compared to approximately 100 hours for comparable BER or EOPP measurement to obtain similar information. For a 4 nm bandwidth DCFBG, practice of a method according to the present invention takes less than 1 minute and matches well the experimental data.

DESCRIPTION OF THE DRAWINGS

FIG. 2 is a graph of a (a) group delay of a dispersion compensation grating measured with modulation phase shift method at fm=62.5 MHz; (b) group delay ripple measured at fm=62.5 MHz, fm=500 MHz, and fm=1150 MHz after subtraction of the gross group delay.

FIG. 3 is a graph of measured (upper curves) and calculated (bottom curves) (a) group delay ripple at fm=500 MHz, (b) group delay ripple at fm=1150 MHz.

FIG. 5 is a graph of reflectivity (a) and phase (b) used to construct the transfer function, wherein 5(c) is a magnified detail portion of FIG. 5(a), and 5(d) is a magnified detail portion of FIG. 5(b).

FIG. 8(a) is a graph of Fourier components of a DCFBG group delay ripple interacting with the 10 Gb/s signal centered at one wavelength and 8(b) is a graph of Fourier components of the group delay ripple of the same DCFBG interacting with the 10 Gb/s signal centered at another wavelength.

FIG. 9 is a graph of: (a) traces for bit "1" and bit "0"; (b) corresponding probability distribution of bit "1" and bit "0".

FIG. 14 is a graph of normalized power versus modulation frequency of an experimental (a) and simulated (b) modulation transfer function at two wavelengths 1550.25 nm and 1551.85 nm showing different response for different Fourier components of input signal.

DETAILED DESCRIPTION

The present invention is directed to a fast system performance characterization method for optical components based on transfer function and/or modulation transfer function. For exemplary purposes, the present description uses a DCFBG in explaining the application of the present method. However, those skilled in the art will appreciate that the method of the present invention may similarly be applied to other optical components.

While traditional simulations have relied on high frequency measurements, the method of the present invention uses lower frequency (e.g., <40 MHz) measurements which prove to be specially advantageous for characterizing gratings having large bandwidths, e.g., greater than one nanometer (>1 nm.). For gratings having large bandwidths, traditional bit-error measurement methods are extremely time consuming, causing difficulty for quality control during commercial production. The method of the present invention offers much faster characterizations.

Long gratings profit from smaller modulation frequencies because the long gratings have group delay ripples with a smaller period. The modulation frequency has a bandwidth that is less than that period. The scanning step size may be chosen according to the modulation frequency used in the measurement.

In an embodiment of the present invention, the ratio of the laser step size ($\Delta\omega$) to the modulation frequency ($\omega_m$) is less than or equal to two. That is:

$\Delta\omega/\omega_m \leq 2$

In a more specific embodiment, $\Delta\omega/\omega_m = 2$

Long gratings of length L exhibit GDR with small ripple periods $\lambda_{ripple}$. The number of points N to accurately resolve such ripple periods over the bandwidth B of interest is:

$$N = \frac{B}{\lambda_{ripple}} = \frac{2 \cdot n}{\lambda_0^2} \cdot B \cdot L$$

with n, the effective index (typically 1.44) and $\lambda_0$, the central wavelength (typically 1550 nm). To obtain the desired accuracy, the GDR is measured with at least this number of points. The system penalty simulation also benefits from having a fine wavelength resolution, since there are uncertainties in the actual channel wavelength caused by drifts throughout the system, including the grating. Measurements finer than 20 pm are desirable. One point requires at least 30 seconds measurement time(example of a $4.10^{-10}$ BER), and more complete measurements take about at least twice that time. The number of bit sequences needed to launch sets this minimal time.

A complete measurement of the grating under traditional methods may reach more than one hour if only 120 points are used. As an example, a 25 cm grating with B=1 nm, the number of points will be 50 with 20 pm resolution, requiring 25 minutes of for measurement. This time is very long compared to the time required for manufacturing such a device, and the measurement requires expensive equipment and extensive expertise.

Figure 1:
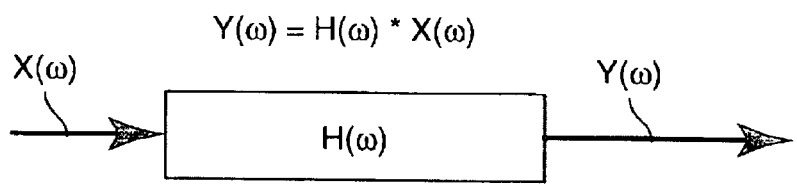
FIG. 1 is a flow diagram of how transfer function $H(\omega)$ relates input signal $X(\omega)$ and output signal $Y(\omega)$.

To devise a method to simulate the performance (power penalty and bit error ratio) of an optical component, an important step was to construct a transfer function (TF) that models how a given component alters a specific frequency of light. In frequency domain, the optical output $Y(\omega)$ from an optical component may be obtained by the product of its transfer function (TF) $H(\omega)$, and the input $X(\omega)$. FIG. 1 is a flow diagram of how a transfer function $H(\omega)$ relates input signal $X(\omega)$ and output signal $Y(\omega)$.

Successful construction of a transfer function of a DCFBG would make it possible to calculate and simulate system performance without resorting to actual time-consuming BER or EOPP measurement.

$H(\omega)$ may be written as:

$$H(\omega)=|H(\omega)|\exp[j\phi(\omega)]. \quad (1)$$

While the amplitude of $H(\omega)$ can be acquired by measuring the DCFBG reflectance (or transmittance) using a broadband source and a high-resolution detector, a conventional way to obtain the phase $\phi(\omega)$ is to use modulation phase shift (MPS) method where the group delay of a DCFBG is measured. However, traditional MPS measurements have been considered unreliable due to the fact that the group delay relies strongly on the modulation frequency.

In group delay measurements, a ripple variation in the delay is found to be superimposed on the desired group delay, which has been attributed to the imperfections in DCFBG fabrication. One of the major obstacles to obtaining the correct phase is that the modulation frequency has a significant impact on the measured group delay. Generally, the ripple amplitude decreases with an increased modulation frequency.

To understand the method of the present invention, it is helpful to understand the modulation phase shift (MPS) method to show how the modulation frequency for the measurement affects the measured group delay ripple. In the MPS method, the amplitude of a measuring laser is modulated to generate two side bands, as shown in the bottom of FIG. 2(a). Ignoring for now that the DCFBG reflection amplitude varies across the fiber Bragg grating band, the optical field reflected back from the DCFBG maybe written as:

$$E \propto \cos(\omega_0 t + \phi_0) + \frac{m}{2}\{\cos[(\omega_0 + \omega_m)t + \phi_+] + \cos[(\omega_0 - \omega_m)t + \phi_-]\} \quad (2)$$

where $\omega_m$ ($\omega_m = 2\pi f_m$) is the modulation frequency and m the modulation depth. $\phi_\pm$ accounts for the phase shift at the two side bands $\omega_0 \pm \omega_m$ with respect to the phase, $\phi_0$, at the central frequency $\omega_0$. RF signal detected by the network analyzer is given by:

$$i(\omega_m, t) = mA(\omega_m)\cos\left(\omega_m t + \frac{\phi_+ - \phi_-}{2}\right) \quad (3)$$

where the RF signal amplitude $A(\omega_m)$ is:

$$A(\omega_m) = \cos\left(\frac{\phi_+ + \phi_- - 2\phi_0}{2}\right). \quad (4)$$

Using the MPS method, both the phase $$\Delta\phi(\omega_0, \omega_m) = \frac{1}{2}(\phi_+ - \phi_-) \quad (5)$$

and the amplitude $A(\omega_m)$ at $\omega_m$ can be detected.

Mathematically, the group delay at frequency $\omega_0$ is defined as:

$$D(\omega_0) = \frac{\partial \phi(\omega)}{\partial \omega}\bigg|\omega = \omega_0. \quad (6)$$

Practically, however, the group delay measured with the MPS method is $$D_{measure}(\omega_0, \omega_m) = \frac{\Delta\phi(\omega_0, \omega_m)}{\omega_m} \quad (7)$$

where $\Delta\phi(\omega_0, \omega_m)$ is given in Equation (5). Here $D_{measure}$ is used to emphasize its difference from the group delay defined in Equation (6) that is independent of the modulation frequency.

FIG. 2 illustrates the group delay of a dispersion compensation grating measured (a) with modulation phase shift method at $f_m$=62.5 MHz and (b) Group delay ripple measured at $f_m$=62.5 MHz, $f_m$=500 MHz, and $f_m$=1150 MHz after subtraction of the gross group delay. Group delay ripple, as exemplified above, shows strong modulation frequency dependence. Curves are vertically shifted for clarity.

FIG. 2(a) shows a typical $D_{measure}$ measured at $f_m$=62.5 MHz. To reveal the detail of the ripple structure, the gross group delay is removed either during the measurement by inserting a single mode fiber or during data analysis, as shown in FIG. 2(b). As a result, $\phi_\pm$ represents the residual phase shift arising from any deviation from ideal DCFBGs. From Equation (7), it may be seen that the group delay ripple measured with MPS method depends upon the modulation frequency $f_m$. Curves in FIG. 2(b) show that the group delay ripple becomes smaller with an increased modulation frequency, in agreement with the observations reported in earlier studies. This decrease may be explained if we relate the measured group delay in Equation (7) to the actual group delay defined in Equation (6):

$$D_{measure}(\omega, \omega_m) = \frac{1}{2\omega_m}\int_{\omega-\omega_m}^{\omega+\omega_m} D(\omega)\,d\omega, \quad (8)$$

which shows that the group delay measured with the modulation frequency of $f_m$ is the actual group delay averaged over the $2f_m$ spectral band.

FIG. 3 is a graph of measured (upper curves) and calculated (bottom curves) (a) group delay ripple at $f_m$=500 MHz, (b) group delay ripple at $f_m$=1150 MHz. Group delay ripples calculated by use of Equation (8) are shown in bottom curves in each figure while the measured group delay ripples are given in top curves in each figure. The calculation results are in agreement with the MPS measured data. In this calculation, $D_{measure}(\omega)$ measured at $f_m$=62.5 MHz was used as the actual group delay ripple, $D(\omega)$. The validity of this replacement lies in the fact that $D_{measure}(\omega)$ approaches $D(\omega)$ when $f_m \to 0$. $D_{measure}(\omega)$ at higher modulation frequencies is calculated by replacing $f_m$ with ($f_m$−62.5 MHz) in Equation (6).

The change of the group delay ripple amplitude at a given wavelength with increasing modulation frequency relies strongly on the detail of the group delay structure. Without wishing to be bound by theory, the studies of the present invention yield that the rate at which the amplitude decays is determined by the Fourier spectrum of the group delay ripple. For simplicity, the total ripple amplitude function to characterize the overall ripple amplitude is then:

$$A(\omega_m) = \int [D_{measure}(\omega, \omega_m)]^2 d\omega. \quad (9)$$

Figure 4:
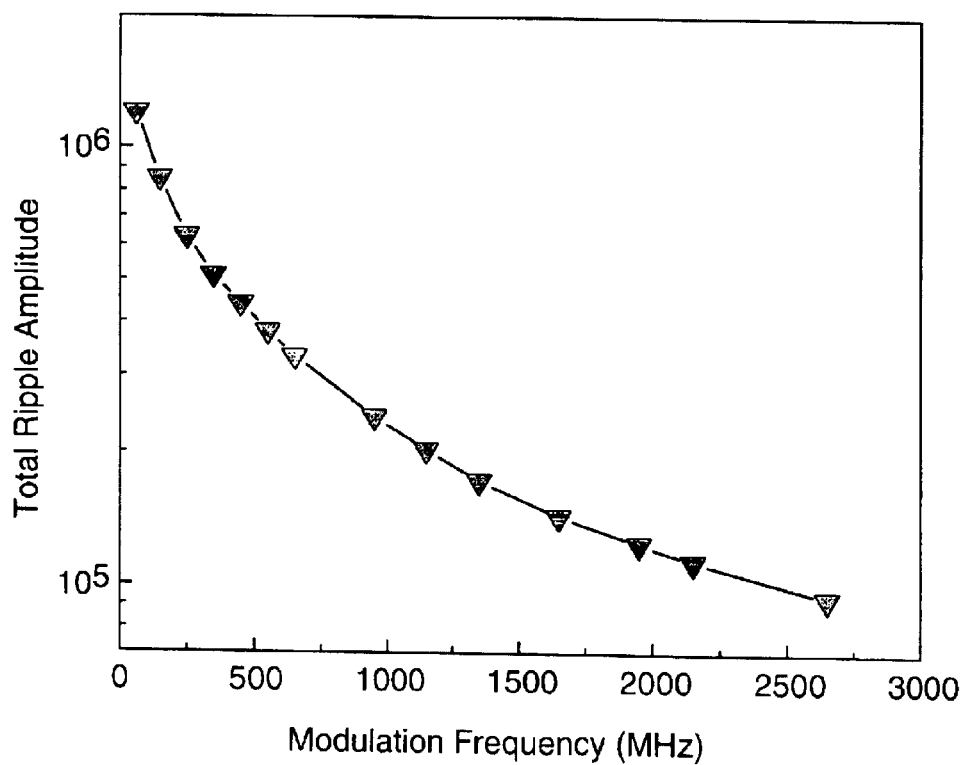
FIG. 4 is a graph of total ripple amplitude function obtained from experimental measurement.

FIG. 4 shows the typical total ripple amplitude function at various modulation frequencies. The rapid decay of the total ripple amplitude indicates that the overall ripple amplitude is highly sensitive to the modulation frequency lower than 500 MHz. Consequently, for the purpose of constructing the phase from the group delay, a low modulation frequency is used to obtain the spectral information in phase. Under this condition, the phase is obtained by:

$$\phi(\omega) = \int_{\omega_0}^{\omega} D_{measure}(\omega)\,d\omega. \quad (10)$$

It may be appreciated that the overall group delay ripple amplitude decays rapidly with an increased modulation frequency due to the fine structure of the delay ripple. As a consequence, the optical phase information needed to construct TF may be acquired only when the modulation frequency is sufficiently low. In summary, the above analysis indicates that a conventional definition of group delay becomes accurate only in the limit of low modulation frequency. The ripple amplitude decreases rapidly when the modulation frequency increases. Consequently, in order to obtain the correct phase, modulation frequency should be kept sufficiently low, that is, as compared to the ripple period.

The analysis above was then applied to an actual MPS measurement and the issue of how to extract the optical phase information for TF reconstruction was addressed.

Experimental Approach to Obtain the Phase for Transfer Function

In the transfer function shown in Equation (1), the amplitude can be obtained by measuring the reflectivity, as shown in FIG. 5. FIG. 5 is a graph of reflectivity (a) and phase (b) used to construct the transfer function. FIG. 5(c) shows a magnified portion of FIG. 5(a), showing that within 2 Ω, the reflectivity variation is less than 0.5 dB. FIG. 5(d) shows the detailed phase structure of the graph of FIG. 5(b). In the meantime, the total phase at $\omega_i$ can be derived from Equation 10:

$$\phi_{total}(\omega_i) = \frac{1}{\omega_m} \sum_{j=1}^{i \geq 1} \Delta\phi(\omega_j)\Delta\omega_j \qquad (11)$$

where $\Delta\omega_j$ is the measurement step size at $\omega_j$. Although the lower modulation frequency gives a better group delay measurement, as discussed in the previous section, the excessively low modulation frequency does not generate more spectral information in phase. The phase spectral resolution, as shown in Equation (11), is eventually limited by the measurement step size $\Delta\omega$.

A scanning laser, such as New Focus 6428 available from New Focus of San Jose, Calif., and a network analyzer, such as HP8753ET available from Agilent Technologies of Palo Alto, Calif., were employed and set to a scanning resolution of 1 pm (approximately 125 MHz at 1550 nm). Therefore, the modulation frequency was chosen to be 62.5 MHz, in which case the upper-band phase $\phi(\omega_j - \omega_m)$ at $\omega_j$ is completely cancelled by the lower band phase $\phi(\omega_{j+1} - \omega_m)$ at $\omega_{j+1}$. The total phase was thus be obtained from:

$$\phi_{total}(\omega_i) = 2 \times \sum_{j=1}^{i} \Delta\phi(\omega_j), \qquad (12)$$

where i=1 is the beginning of the useful band in DCFBGs. Other combinations are possible dependent upon the desired resolution and the system limitations. The phase reconstruction error in the experiment was approximately 4 mrad, resulting mainly from the network analyzer phase sensitivity and the variation in scanning step size.

It should be noted that Equation (8) is obtained based on the assumption of the uniform reflectivity across the grating band. A correction term arising from the insertion loss ripple may be added to the phase measured by the network analyzer given in Equation (5):

$$c = \arctan\left(\frac{r_+ - r_-}{r_+ + r_-} \times \tan\frac{\phi_+ + \phi_- - 2\phi_0}{2}\right) \qquad (13)$$

where $r_\pm$ is the reflectivity at each of the two side bands. Since the DCFBG reflectivity variation within $2\omega_m$ is less than 0.5 dB, as exemplified by FIG. 5(c), this correction term accounts for only a few percent in the phase. For simplicity, this correction is ignored in the discussion and the simulation later on. For the actual simulation, however, this correction term was taken into account.

FIG. 5(b) shows the typical phase obtained using the above method. A detailed phase ripple is given in FIG. 5(d). The slowly varying envelope does not affect the system performance, as only the phase variation within the spectral band defined by the bit rate has a significant impact on the system performance (for a 10 Gb/s system, the bandwidth is approximately 80 pm).

Once the DCFBG transfer function is known, the temporal behavior of the output y(t) for a given input signal x(t) may be calculated as:

$$y(t) = \int Y(\omega)e^{j\omega t}d\omega = \int H(\omega)X(\omega)e^{j\omega t}d\omega = \int |H(\omega)||X(\omega)|e^{j[\omega t + \phi(\omega)]}d\omega \qquad (14)$$

where $X(\omega)$ and $Y(\omega)$ are the spectra of the input and output signal, respectively.

Figure 6A:
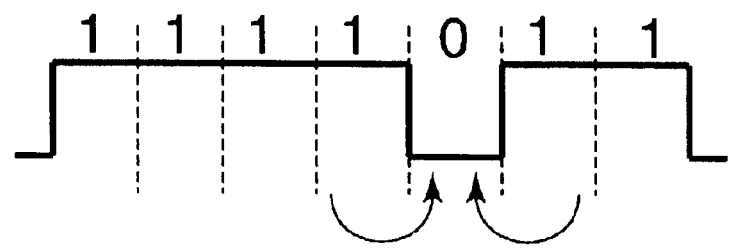
FIG. 6 is a graph of 7-bit sequence used in simulation.
Figure 6B:
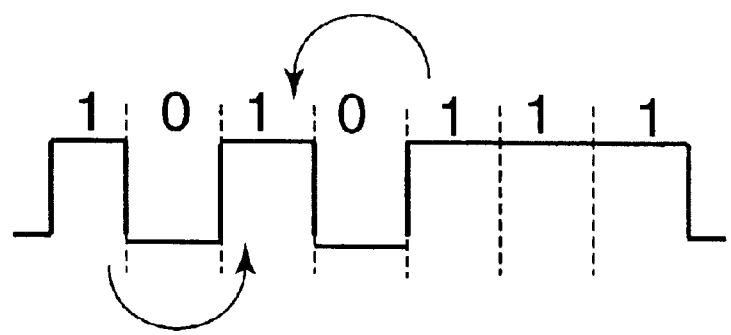

The present simulation used a 7-bit square-wave sequence to represent a $10^{23}-1$ unchirped Non-Return-to-Zero (NRZ) data stream used in test-bed measurements. FIG. 6 illustrates a 7-bit sequence used in simulation. Arrows indicate the effects on bit "0" or bit "1" from their respective nearest neighbors. Using a larger number of bits yields similar results at the expense of simulation time. For a 10 Gb/s data stream, 100 ps was assigned to each time slot, as marked by the dashed bars in FIG. 6. The bandwidth within which the 10 Gb/s signal interacts with the transfer function was set to be 12.5 GHz. Other effects, such as the fiber nonlinearities and polarization mode dispersion, were ignored. In the absence of group delay and insertion loss ripples, the power level of bit "1" was normalized to one while bit "0" was set to zero. In addition, a fifth order Bessel filter with 3-dB point set at 6.4 GHz was employed to model the low-pass receiver used in the present test-bed system.

To verify the validity of the present method, the pulse shape calculated using the transfer function was compared with the actual pulse distortion obtained by sending data sequence generated by a pattern generator, such as Anritsu 1763B, to DCFBGs.

Figures 7A, 7B:
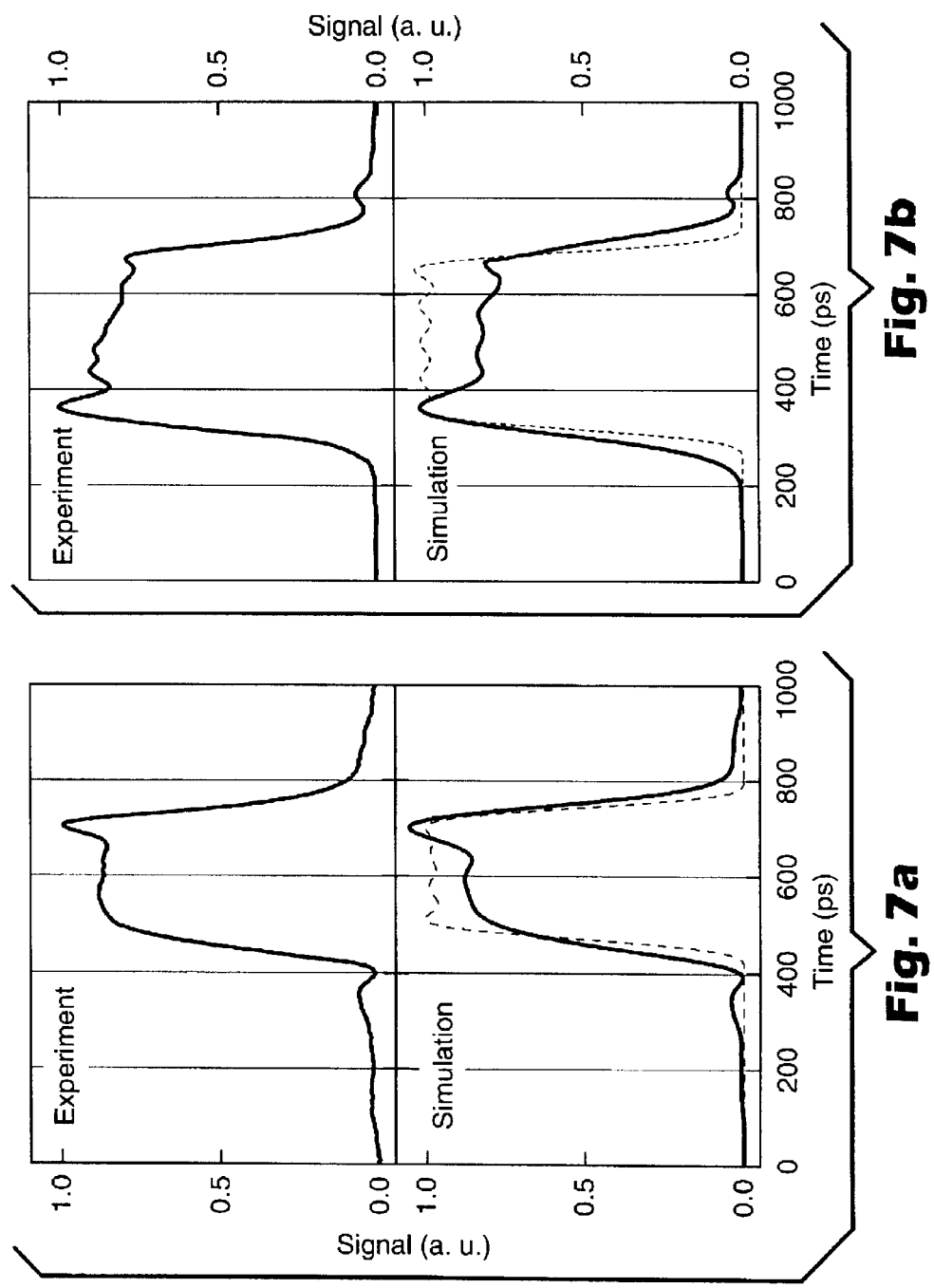
FIG. 7 is a graph of optical signal (top curves) of a 10 Gb/s "1-1-1" symbol (a) and a "1-1-1" symbol (b) measured at two different wavelengths after passing a DCFBG.

FIG. 7 shows one of the examples of such comparison at two wavelength locations where 10 Gb/s NRZ symbol "1-1-1" and "1-1-1-1" are used. FIG. 7 illustrates optical signal (top curves) of a 10 Gb/s "1-1-1" symbol (a) and a "1-1-1-1" symbol (b) is measured at two different wavelengths after passing a DCFBG. The input symbol sequence is generated by the pattern generator. Bottom curves show the calculated corresponding symbol distortions using the DCFBG transfer function. The original "1-1-1" and "1-1-1-1" symbols used in simulation are shown in dashed curves as a reference.

The effects of group delay ripples and insertion loss ripples on the signal symbols are usually grouped into two categories. In addition to the distortion occurring at an output symbol itself as a result of the intra-symbol interference, the energy leaking to the nearby time slots gives rise to the inter-symbol interference. In the present simulation, a uniform treatment was given by considering only the power level for bit "1" and bit "0", irrespective of whether the change in the bit power level results from the intra- or inter-symbol interference, as discussed later.

The power penalty in system performance results from the decreased power level for bit "1" and the increased power level for bit "0". Earlier studies using a well-defined sinusoidal group delay ripple showed that the energy leaking to the nearby time slots forms a pure echo with the echo delay being inversely proportional to the ripple periodicity.

For actual DCFBGs tested, however, the spectra of the group delay ripples that interact with the signal lie in a broad range. FIGS. 8(a) and 8(b) show the typical Fourier components of the group delay ripples associated with the sample gratings. By "typical", it is meant that the structure shown in FIGS. 8(a) and (b) may be observed at any wavelength on any of the sample gratings. FIG. 8 shows, as an example, the typical Fourier components of a DCFBG group delay ripple interacting with the 10 Gb/s signal centered at two different wavelengths, where 12.5 GHz spectral window is used to select the ripples. As a consequence, the ripple components do not oscillate in phase with each other to form a distinct echo a few time slots away from the input signal. The resultant leaking energy is mostly concentrated in the adjacent time slots, beyond which the signal intensity features a rapid decay, as exemplified in FIG. 7. Calculation shows that the time-integrated energy within the bit of interest and its two nearest neighbors amounts to over 99% of total input signal energy. Consequently, in our calculation for bit "1" or bit "0", only the effects from its nearest neighbors are considered, as schematically shown by arrows in FIG. 6.

The present simulation follows the "worst case" scenario. For bit "0", "worst case" means the electric field of two nearest symbols are adjusted to be in phase. For an example, the right tail of symbol "1-1-1-1" and the left tail of symbol "1-1" in FIG. 6(a) add constructively to give a "hump" in bit "0". For bit "1", "worst case" requires that electric field from the nearby symbols be adjusted to be out of phase with respect to the bit of interest in order to decrease the power level in this bit "1". However, the treatment for bit "1" is slightly different from that for bit "0". Although both symbol "1" on the left side of the sequence and symbol "1-1-1" on the right side are the nearest neighbors of symbol "1" at the center in FIG. 5(b), the possibility of these two symbols being both out of phase at the same time relative to bit "1" at the center is extremely low. Therefore, the negative impact on the bit "1" at the center from the right tail of symbol "1" and from the left tail of symbol "1-1-1" is calculated separately.

After the evaluation of the effects of the nearest neighbors, a number of traces for both bit "1" and bit "0" was obtained for various symbol pattern combinations, as illustrated in trace 1–4 in FIG. 9(a). In the presence of noise, the probability distributions of those traces, instead of being δ-function like, spread as depicted in FIG. 9(b).

In an actual BER test, a pseudo-random symbol pattern is sent into the system where the occurrence of each trace is the same. Therefore, the BER test measures the overall probability distribution averaged over all symbol patterns. In contrast, in the present simulation, the "worst case" scenario still applies, where only the lowest trace for bit "1" and the highest trace for bit "0" are selected. These two particular traces correspond to two particular symbol patterns called "worst symbol pattern". By doing so, the worst power penalty in a DCFBG was found when the worst symbol patterns are sent, which is of significance in DCFBG screening processes.

Figure 10:
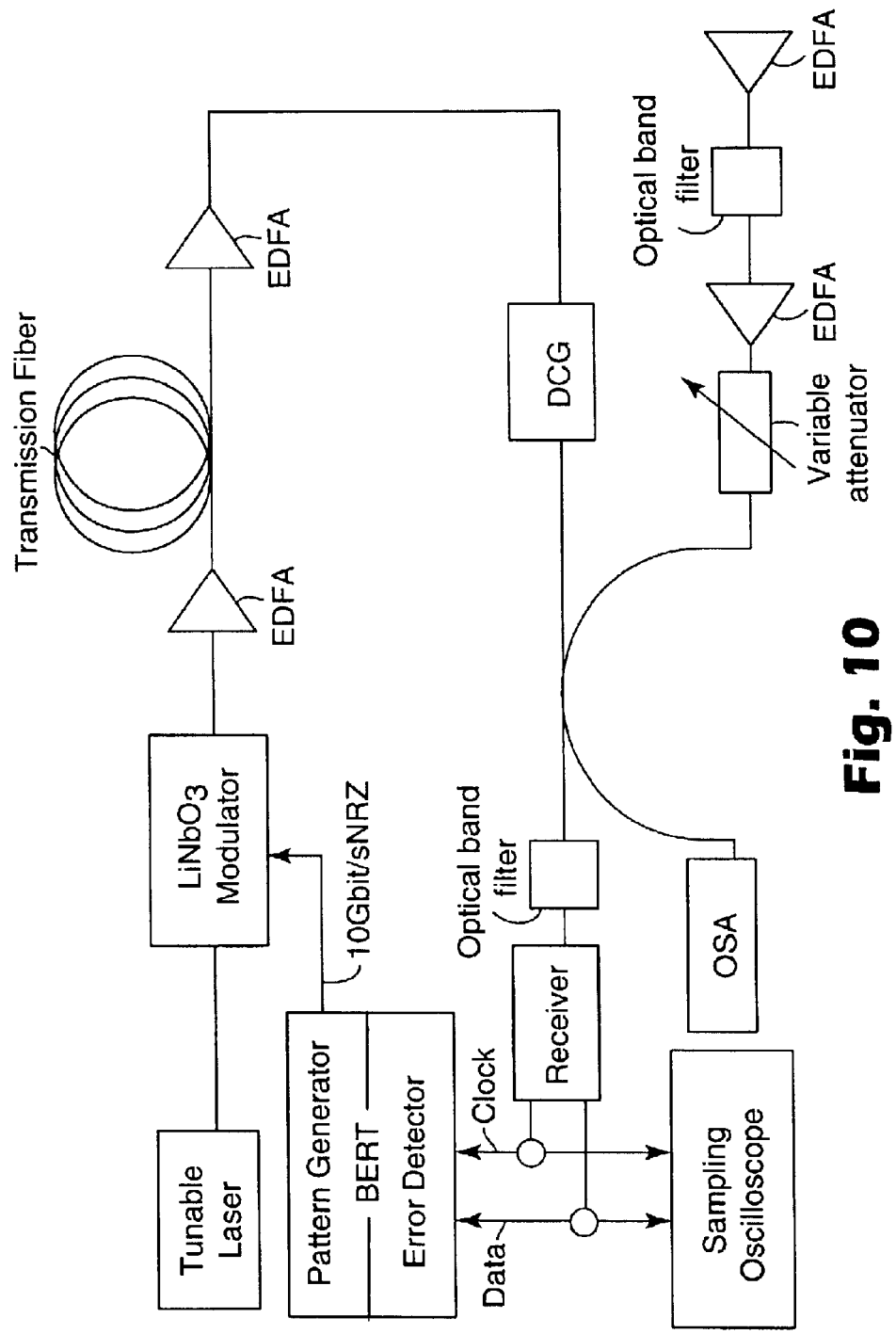
FIG. 10 is a graph of noise-loaded 10 Gb/s NRZ test-bed system setup.

Once the power levels for bit "1" and for bit "0" were obtained, the power penalty corresponding to our test-bed configuration was calculated to compare with test-bed measurement. FIG. 10 shows the noise-loaded 10 Gbit/s test-bed system setup with NRZ modulation format. The power of the transmitted optical signal was kept constant whereas the noise was introduced externally by mixing the spontaneous emission from an erbium-doped fiber amplifier (EDFA) with the transmitted optical signal. This external noise was adjusted at each wavelength to ensure the BER to be $10^{-9.5\pm0.1}$ throughout the measurement. The change in optical signal-to-noise ratio (OSNR) was thus obtained by comparing the noise power level before and after the insertion of the DCFBG module and the transmission fiber.

The power penalty in the simulation is calculated according to the test-bed configurations. The constant BER lead to the following equation:

$$\frac{I'(1) - I'(0)}{\sigma'(1) + \sigma'(0)} = \frac{I(1) - I(0)}{\sigma(1) + \sigma(0)} \quad (15)$$

where I'(1) (or I'(0)) and σ'(1) (or σ'(0)) represent the "worst case" power levels for bit "1" (or bit "0") and its corresponding noise standard deviation. The unprimed parameters stand for the quantities before the insertion of a DCFBG and the transmission fiber (back-to-back).

The noise standard deviation σ after the photo-receiver can be decomposed into:

$$\sigma^2(1) = \sigma_{ext}^2 + AI(1)P_{ext} + \sigma_{other}^2$$

$$\sigma^2(0) = \sigma_{ext}^2 + AI(0)P_{ext} + \sigma_{other}^2 \quad (16)$$

where $\sigma_{ext}$ is the external noise standard deviation and $P_{ext}$ is the external noise power level. A is determined by the optical filter bandwidth and receiver bandwidth. $\sigma_{other}$ represents the contribution from other sources such as thermal noise and shot noise. With our test-bed configuration, only the term $AIP_{ext}$ dominates. The OSNR penalty corresponding to our test-bed system was calculated as:

$$OSNR(dB) = -10\log_{10}\frac{P'_{ext}}{P_{ext}} \approx -20\log_{10}\left[\frac{\sqrt{I'(1)} - \sqrt{I'(0)}}{\sqrt{I(1)} - \sqrt{I(0)}}\right]. \quad (17)$$

Note that while Equation (17) is suitable for signal-dependent noise that occurs in our test-bed system, for signal-independent noise, the OSNR power penalty becomes $$OSNR(dB) = -10\log_{10}\frac{P'_{ext}}{P_{ext}} \approx -10\log_{10}\left[\frac{I(1)' - I(0)}{I(1) - I(0)}\right]. \quad (18)$$

Figure 11B:
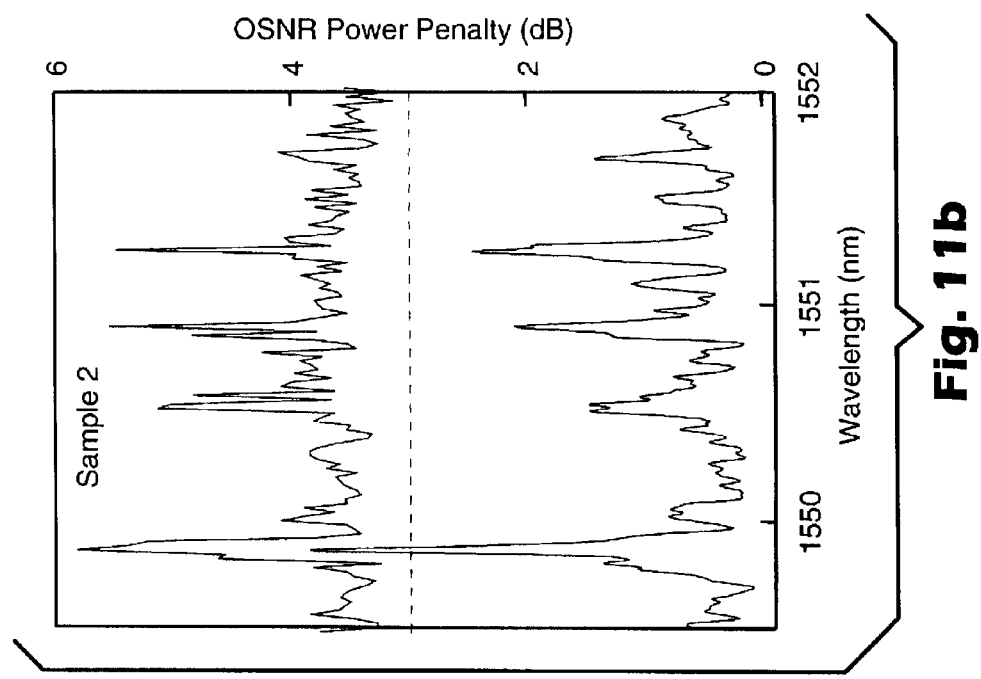
FIG. 11(a) is a graph of comparison between simulated OSNR power penalty (bottom curves) and the test-bed measurement (upper curve) for a first sample and 11(b) is a graph of comparison between simulated OSNR power penalty (bottom curves) and the test-bed measurement (upper curve) for a second sample.
Figure 11A:
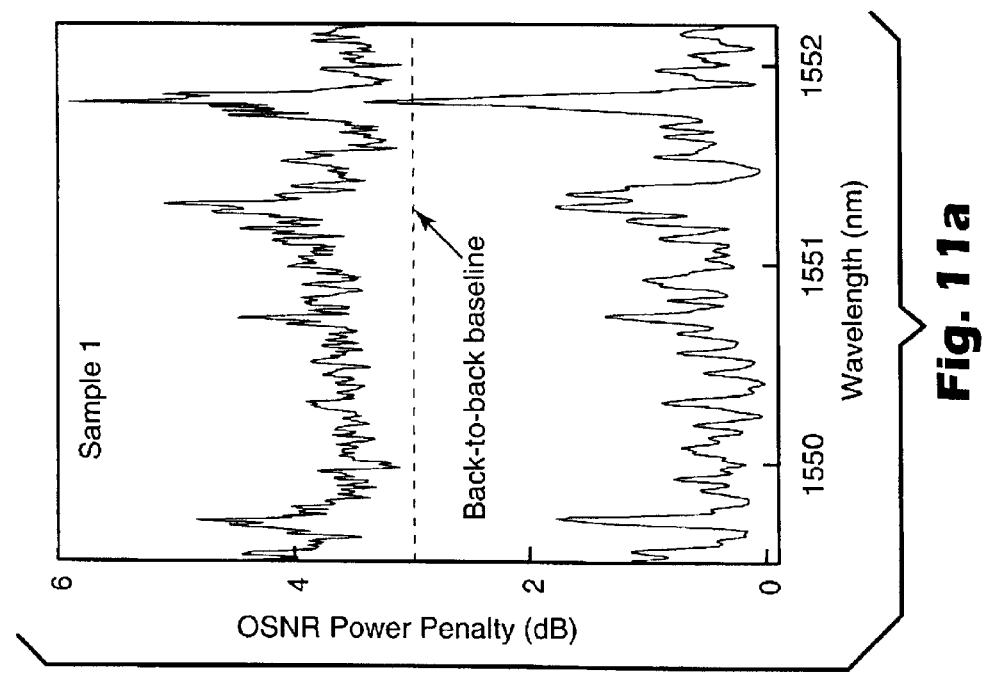

FIG. 11 plots a portion of the simulation results for two samples with the spectral resolution of 1 pm. FIG. 11 shows a comparison between simulated OSNR power penalty (bottom curves) and the test-bed measurement (upper curve). Curves are vertically shifted for clarity. The power penalty is measured at BER=$10^{-9.5\pm0.1}$. The back-to-back baseline is shown as a dashed curve. For comparison, FIG. 11 shows the test-bed measurement data with the 5 pm spectral resolution. While the amplitude of the simulated power penalty is larger than the test-bed measurement as a result of "worse case" scenario, the OSNR power penalty simulation reveals nearly all the features in the OSNR power penalty obtained with the test-bed measurement.

In the limit of DCFBGs, where the spread of the traces in FIG. 9 becomes small, the "worst case" simulation should approach the actual test-bed measurement. This has been confirmed both by the data shown in FIG. 11 where OSNR is low and by using the good DCFBGs with OSNR power penalty less than 2 dB. Currently, the simulation is used as a screening tool during DCFBG fabrication processes. The total simulation time for 4 nm DCFBG with 1 pm spectral resolution takes approximately half a minute with a current desktop computer. When this is compared to over 5 hours needed to achieve the same results in test-bed measurements, the significant reduction in time and related cost is obvious.

The computer simulation method based on TF features a fast and versatile approach to obtain the system performance of a DCFBG. The result of a simulation in accordance with the method of the present invention is in general agreement with the test-bed measurement. The simulation for 4 nm DCGs with 10 Gb/s NRZ modulation format takes less than one minute, and may, therefore, be used as a screening tool during DCG fabrication. Furthermore, our simulation shows strong flexibility in that it may easily be modified to accommodate 40 Gb/s systems and Return-to-Zero modulation format.

In addition to a transfer function method described previously, the modulation transfer function (MTF) provides an alternative that enables one to use computer simulation for system performance characterization.

Basically, the MTF $T(\omega, \omega_m)$ determines the system response to a particular data frequency component $\omega_m$ in the input signal $X(\omega, \omega_m)$ and may be mathematically written as:

$$Y(\omega_0,\omega_m)=T(\omega_0,\omega_m)X(\omega_0,\omega_m) \quad (19)$$

where $\omega_0$ is the central optical frequency.

The MTF is obtained using generally the same MPS method described above where power of RF signal detected by network analyzer is measured, i.e., $$P(\omega_m) = <i^2(\omega_m, t)> \propto \cos^2\left(\frac{\phi_+ + \phi_- - 2\phi_0}{2}\right). \quad (20)$$

Figures 12A, 12B:
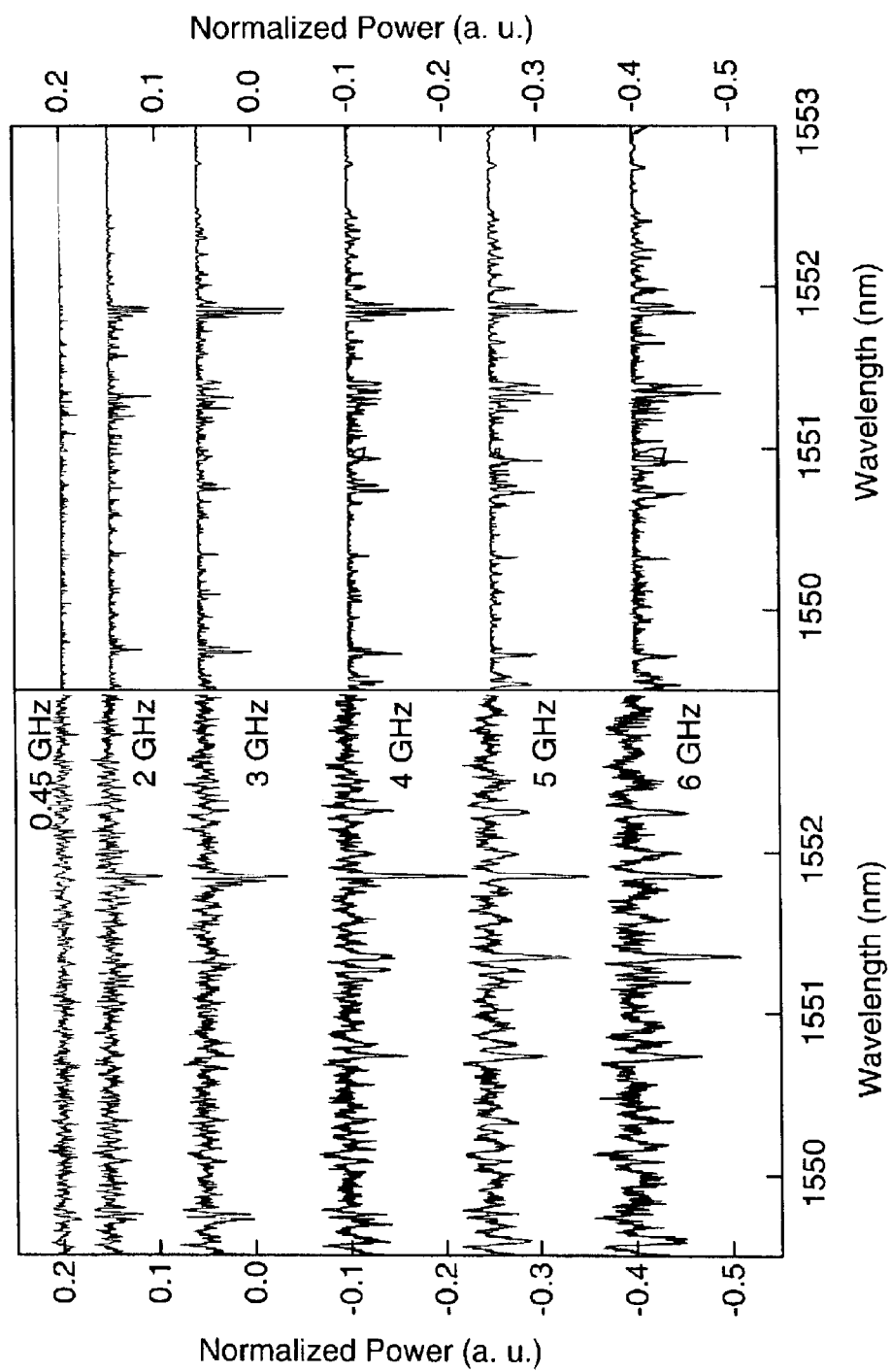
FIG. 12 is a graph of normalized power versus wavelength of (a) modulation function spectra at various modulation frequencies measured using MPS method; (b) corresponding simulated modulation function spectra.

Experimentally, the MTF spectrum may be obtained by scanning the tunable laser at various modulation frequency $\omega_m$, as shown in FIG. 12(a), or by scanning the modulation frequency $\omega_m$ at various optical frequency $\omega_0$, as shown in FIG. 14(a).

FIG. 12 illustrates (a) modulation function spectra at various modulation frequencies measured using MPS method; and (b) corresponding simulated modulation function spectra. FIG. 14 illustrates the (a) experimental and (b) simulated modulation transfer function at two wavelengths, 1550.25 nm and 1551.85 nm, to show different response for different Fourier components of input signal. Note that MTF reflects the dispersion of a DCFBG. Any non-zero dispersion induced impairment will emerge as a dip in MTF. The bottom trace in FIG. 11 shows the sum of the traces in FIG. 12(a), giving an overall evaluation of the system performance for each wavelength. For a comparison, OSNR power penalty measurement data are also plotted. As expected, a large OSNR power penalty occurs at those areas that the MTF shows the degradation such as 1551.3 nm, and 1551.85 nm. FIG. 14 shows that the MTF of a DCFBG responds differently to different Fourier components of the input signal at 1550.25 nm, where the OSNR power penalty is small, and at 1551.85 nm where system performance is compromised.

Figure 13:
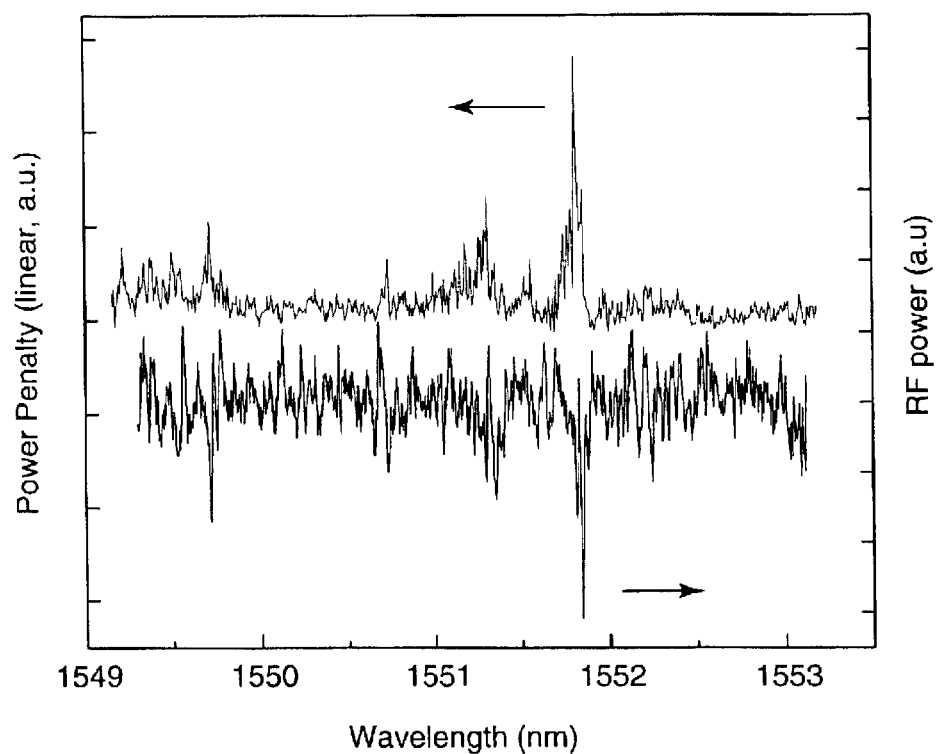
FIG. 13 is a graph of power penalty versus wavelength of a modulation transfer function that reflects the degradation in system performance.

FIG. 13 shows how the modulation transfer function reflects the degradation in system performance. It should be noted that MTF also may be simulated from the phase $\phi(\omega)$ in TF, as shown in FIGS. 12(b) and 14(b). Therefore, when the phase reconstruction is achievable, TF provides a superior approach to calculate the system EOPP. However, when the group delay ripple is too fine to resolve in such device as long DCFBGs, MTF shows its power in that MTF may be constructed with high spectral resolution by scanning the modulation frequency $\omega_m$.

EXAMPLE 1

Referring to FIG. 11, an exemplary characterization using traditional methodology was performed on a 0.25 meter chirped grating having a bandwidth of 3 nanometers on a test-bed with 20 pico-meter step size. The measurement time was approximately 150 minutes using a Pentium III 550 MHz CPU. The same characterization was performed using the same computational equipment, but applying the method of the present invention, with 1 pico-meter step size. The resulting characterization time was reduced down to 30 seconds.

The present description present the theoretical foundation and experimental approach to developing a transfer function and the modulation transfer function for an optical component, such as a DCFBG, for fast system performance characterization. A simulation in accordance with the method of the present invention shows agreement with experimental data and shortens the characterization time by more than 100-fold, thus providing a powerful and cost-efficient tool for mass-production of DCFBGs. The present method treats the whole group delay as an entirety and therefore preserves the coherent interaction between each component in the group delay ripple.

What we claim is:

1. A method for screening the quality of an optical component, the method comprising the steps of:
   a. simulating the performance of the optical component, the step of simulating comprising the steps of:
      i. measuring the optical phase $\phi$ of the optical component, wherein the step of measuring comprises indirectly measuring the optical phase $\phi$ of the optical component using a scanning laser having a scanning step size $\Delta\omega$ and a modulation frequency $\omega_m$ such that $\Delta\omega/\omega_m=2$ ii. measuring the light throughput R of the optical component;
      iii. constructing a transfer function H as a function of optical frequency $\omega$ where $H(\omega)=R(\omega)\exp[j\phi(\omega)]$, and iv. simulating the performance using the measured value of the optical phase and the light throughput into the transfer function.

2. The method of claim 1, wherein the optical component is an optical Bragg grating having a bandwidth greater than 1 nanometer.

3. The method of claim 1, wherein $\omega_m<40$ MHz.

4. The method of claim 1, wherein the optical component is an optical grating.

5. The method of claim 1, wherein the optical component is a dispersion compensation optical grating.

6. The method of claim 1, wherein the step of measuring comprises using an interferometer.

7. A method for simulating the performance of the optical component, the method comprising the steps of:
   a. measuring the optical phase $\omega$ of the optical component, wherein the step of measuring comprises indirectly measuring the optical phase $\omega$ of the optical component using a scanning laser having a scanning step size $\Delta\omega$ and a modulation frequency $\omega_m$ such that $\Delta\omega/\omega_m=2$ b. measuring the light throughput R of the optical component;
   c. constructing a transfer function H as a function of optical frequency $\omega$ where $H(\omega)=R(\omega)\exp[j\phi(\omega)]$, and d. simulating the performance using the measured value of the optical phase and the light throughput into the transfer function.

8. The method of claim 7, wherein the optical component is an optical Bragg grating having a bandwidth greater than 1 nanometer.

9. The method of claim 7, wherein $\omega_m<40$ MHz.

10. The method of claim 7, wherein the optical component is an optical grating.

11. The method of claim 7, wherein the optical component is a dispersion compensation optical grating.

12. The method of claim 7, wherein the step of measuring comprises using an interferometer.

* * * * *

UNITED STATES PATENT AND TRADEMARK OFFICE
CERTIFICATE OF CORRECTION

PATENT NO. : 6,781,698 B2
DATED : August 24, 2004
INVENTOR(S) : Fan, Xudong

It is certified that error appears in the above-identified patent and that said Letters Patent is hereby corrected as shown below:

Column 7,
Line 23, delete "$\phi(\omega_j - \omega_m)$" and insert in place thereof -- $\phi(\omega_j + \omega_m)$ --.

Column 9,
Line 28, delete "6-function" and insert in place thereof -- $\delta$-function --.

Column 10,
Line 1, delete "a" and insert in place thereof -- $\sigma$ --.

Line 4, delete "$\sigma^2(1) = \sigma_{ext}^2 + AI(1)P_{ext} + \sigma_{other}^{2n}$" and insert
-- $\sigma^2(1) = \sigma^2_{ext} + AI(1)P_{ext} + \sigma^2_{other}$ --

Line 6, delete "$\sigma^2(0) = \sigma_{ext}^2 + AI(0)P_{ext} + \sigma_{other}^2$" and insert
-- $\sigma^2(0) = \sigma^2_{ext} + AI(0)P_{ext} + \sigma^2_{other}$ --

Column 12,
Lines 40 and 42, delete "$\omega$" and insert in place thereof -- $\phi$ --.

Signed and Sealed this

Eighteenth Day of January, 2005

JON W. DUDAS
*Director of the United States Patent and Trademark Office*